United States Patent
Park et al.

(10) Patent No.: US 7,364,231 B2
(45) Date of Patent: Apr. 29, 2008

(54) SELF LOCKING DEVICE OF AN ACTIVE HEADREST

(75) Inventors: Sang Do Park, Ansan-si (KR); Kwang Bin Im, Anyang-si (KR)

(73) Assignee: Kia Motors Corporation, Seoul (KR)

(*) Notice: Subject to any disclaimer, the term of this patent is extended or adjusted under 35 U.S.C. 154(b) by 0 days.

(21) Appl. No.: 11/648,882

(22) Filed: Dec. 29, 2006

(65) Prior Publication Data

US 2008/0036262 A1 Feb. 14, 2008

(30) Foreign Application Priority Data

Aug. 10, 2006 (KR) .................. 10-2006-0075708

(51) Int. Cl.
*B60R 21/00* (2006.01)
(52) U.S. Cl. .................................. 297/216.12
(58) Field of Classification Search ........... 297/216.12, 297/404, 408
See application file for complete search history.

(56) References Cited

U.S. PATENT DOCUMENTS 5,927,804 A * 7/1999 Cuevas .................. 297/216.12
6,213,549 B1 * 4/2001 Wieclawski ............ 297/216.13
2002/0195846 A1 * 12/2002 Masuda et al. ........ 297/216.12
2005/0264051 A1 * 12/2005 Lawall et al. .......... 297/216.12
2006/0006708 A1 * 1/2006 Becker et al. ......... 297/216.12
2006/0119150 A1 * 6/2006 Hoffmann .............. 297/216.12

FOREIGN PATENT DOCUMENTS

| JP | 2000-217660 | 8/2000 |
| JP | 2004-106647 | 4/2004 |
| JP | 2004-148942 | 5/2004 |
| JP | 2004-358207 | 12/2004 |
| KR | 10-2005-0083274 | 8/2005 |

* cited by examiner

*Primary Examiner*—Milton Nelson, Jr.
(74) *Attorney, Agent, or Firm*—Morgan Lewis & Bockius LLP

(57) ABSTRACT

An active headrest includes a panel inside a seat frame, a panel link supporting the panel and rotating in response to raising of the panel, and a frame which is raised by the panel. A self locking device of the active headrest includes: a guide cylinder in the seat back frame, defining a receiving indentation therein; a return spring in the receiving indentation; and a locking piston in the receiving indentation, a first end of the locking piston being coupled to the return spring, and a second end of the locking piston being exposed to outside the guide cylinder, wherein the locking piston is kept in the guide cylinder by the panel link at the non-operated position of the active headrest, and pressed outside of the guide cylinder by the return spring to restrain rotation of the panel link at the operated position of the active headrest.

4 Claims, 3 Drawing Sheets

SELF LOCKING DEVICE OF AN ACTIVE HEADREST

CROSS-REFERENCE TO RELATED APPLICATION

This application claims priority to and the benefit of Korean Patent Application No. 10-2006-0075708 filed in the Korean Intellectual Property Office on Aug. 10, 2006, the entire contents of which are incorporated herein by reference.

BACKGROUND OF THE INVENTION (a) Field of the Invention

The present invention relates to a self locking device of an active headrest, and more particularly to a self locking device of an active headrest which locks the active headrest after operation of the active headrest such that the active headrest can continuously support the head and the neck of an occupant without returning to its original position.

(b) Description of the Related Art

An active headrest is a headrest which is automatically raised so as to support the head of an occupant when strong impact acts on a vehicle by a vehicle crash, etc.

The active headrest cooperates with a seat in order to prevent strong impact from acting on the head and the neck of an occupant, and moves upward and forward to support the head and the neck of the occupant.

During a rear-end collision, the body of an occupant is thrust to the rear of a seat. Accordingly, an active headrest is raised so as to support the head and neck of the occupant.

However, the conventional active headrest returns to its original position after operation thereof, so that it cannot continuously support the head and neck of the occupant.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a self locking device of an active headrest which locks the active headrest so as to make the active headrest continuously support the head and the neck of an occupant after an operation thereof.

An exemplary embodiment of the present invention provides a self locking device of an active headrest which is driven by an active panel which is disposed inside a seat back frame and supports a body of an occupant from a rear side thereof, a panel link coupled to each side of the active panel so as to support the active panel and rotates toward a rear of the seat back frame in response to raising of the active panel, and an active frame which is raised by the active panel. The self locking device is disposed at an inner side of the seat back frame so as to support a side of a panel link at an operated position of the active headrest, thereby preventing the active headrest from going down, and to release a state of supporting the panel link at a non-operated position of the active headrest.

The self locking device may include: a guide cylinder at an inner portion of a side of the seat back frame, at a position which is covered by the panel link at a non-operated position of the active headrest, and is exposed at an operated position of the active headrest, and defining a receiving indentation therein; a return spring in the receiving indentation; and a locking piston in the receiving indentation, one end of the locking piston being coupled to the return spring and the other end thereof being exposed to the outside of a guide cylinder, and the locking piston being pushed into the guide cylinder by the panel link so as to compress the return spring at the non-operated position of the active headrest, the locking piston being exposed to the outside of the guide cylinder by the return spring so as to support a front of the panel link at the operated position of the active headrest.

The end of the locking piston which is coupled to the return spring may be coupled to a strap for returning to an inside of the locking piston.

DETAILED DESCRIPTION OF THE PREFERRED EMBODIMENTS

An exemplary embodiment of the present invention will hereinafter be described in detail with reference to the accompanying drawings.

Figure 1:
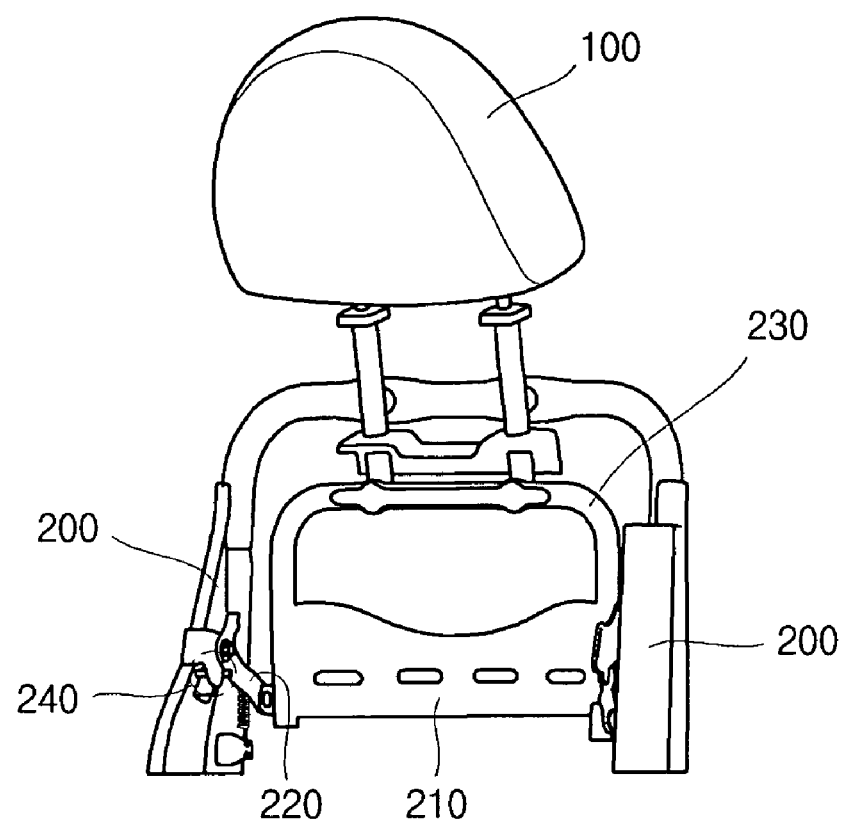
FIG. 1 is a perspective view of a self locking device of an active headrest according to an exemplary embodiment of the present invention.

As shown in FIG. 1, an active headrest 100 according to an exemplary embodiment of the present invention is driven by a force delivery apparatus (not shown), which is installed inside a seat back frame 200 and moves rearward and upward within the seat back frame 200 by the body of an occupant during a crash. An active panel 210, supporting the body of the occupant from the rear side thereof, is raised by the force delivery apparatus. A panel link 220 is coupled to each side of the active panel 210 so as to rotatably support the active panel 210. An active frame 230 is coupled to an upper portion of the active panel 210 and is raised by the active panel 210 to operate the active headrest 100.

A self locking device 240 locks the panel link 220 in place so as to lock an operation position of the active headrest 100.

As shown in FIGS. 2 and 3, one side of the panel link 220 is coupled to a link bracket 225 which is coupled to an inner side portion of the seat back frame 200. The panel link 220 is fixed to an inner side of the link bracket 225 by a frame coupling hinge 222, and the other side of the panel link 220 is coupled to a side surface of the active panel 210 by a panel coupling hinge 224 (although it is not shown in the drawing, the panel links 220 are provided on both inner sides of the seat back frame 200).

The panel link 220 rotates toward the rear of the seat back frame 200 with respect to the frame coupling hinge 222 as the active panel 210 goes up.

At a non-operated position of the active headrest 100, i.e., a position at which the panel link 220 is not rotated by the active panel 210, the self locking device 240 is not driven. At an operated position of the active headrest 100, i.e., when the panel link 220 rotates toward the rear of the seat back frame 200 by the active panel 210, the self locking device 240 is operated so as to prevent return of the panel link 220, thereby preventing the active headrest 100 from returning.

As shown in FIG. 2A to FIG. 3B, the self locking device 240 includes a guide cylinder 242 which is provided to an inner portion of a side of the seat back frame 200 and defines a receiving indentation 242a therein, a return spring 244 which is inserted into the receiving indentation 242a of the guide cylinder 242, a locking piston 246 which is inserted into the receiving indentation 242a and is disposed outside the return spring 244 so as to lock the panel link 220, and a strap 248 for returning the locking piston 246 to an original position thereof.

The receiving indentation 242a is formed inside the guide cylinder 242 so as to receive the return spring 244, the locking piston 246, and the strap 248. It is preferable that the guide cylinder 242 is disposed at a position where the guide cylinder 242 is exposed when the panel link 220 is rotated by the active panel 210 and is covered when the panel link 220 is not rotated.

Figure 2A:
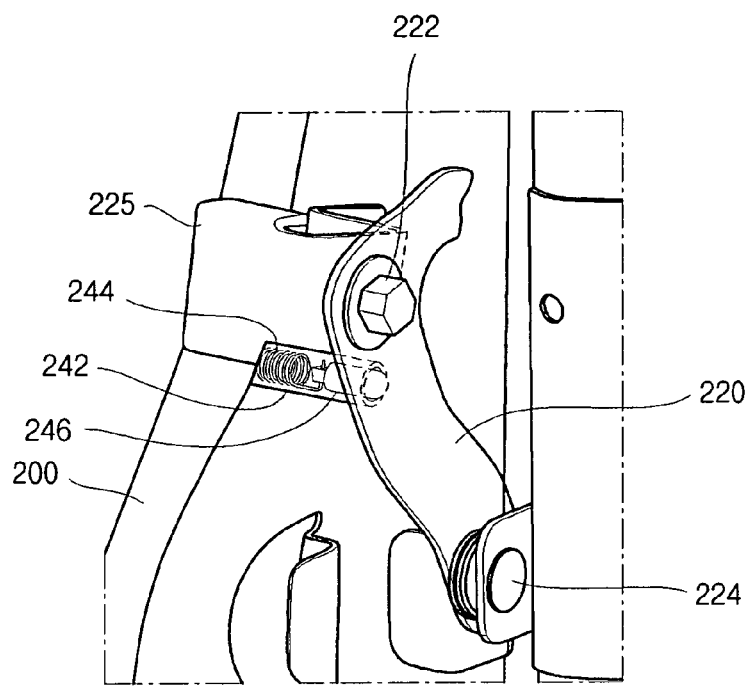
FIG. 2A is a perspective view showing a self locking device of an active headrest before its operation according to an exemplary embodiment of the present invention.
Figure 2B:
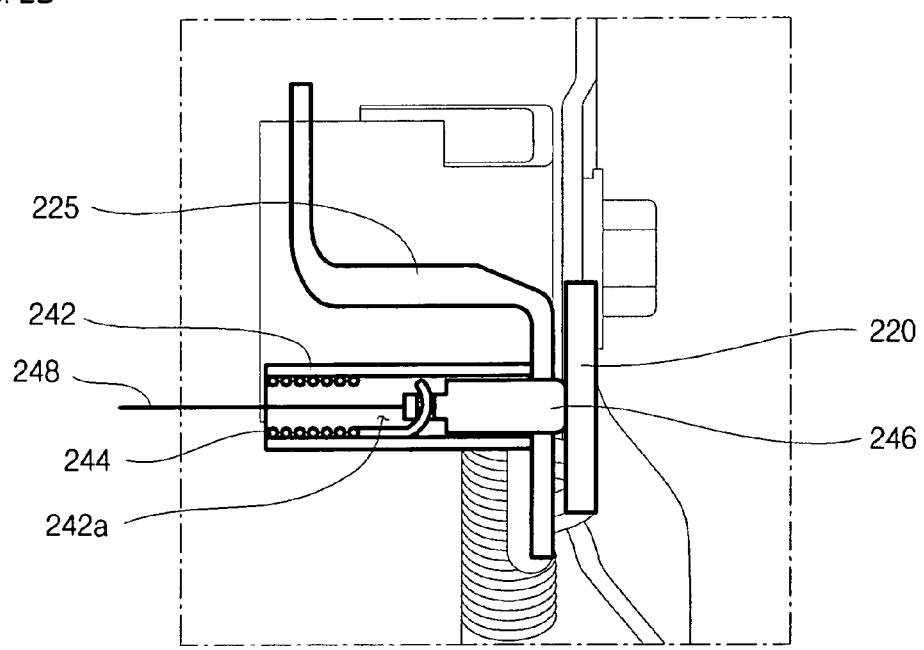
FIG. 2B shows an interior of a self locking device of an active headrest before its operation according to an exemplary embodiment of the present invention.

As shown in FIG. 2A and FIG. 2B, the return spring 244 is disposed within the receiving indentation 242a and elastically supports the locking piston 246. If the locking piston 246 is compressed by the panel link 220 at a non-operated position of the active headrest 100, the return spring 244 is compressed while retreating into the inside of the receiving indentation 242a.

Figure 3A:
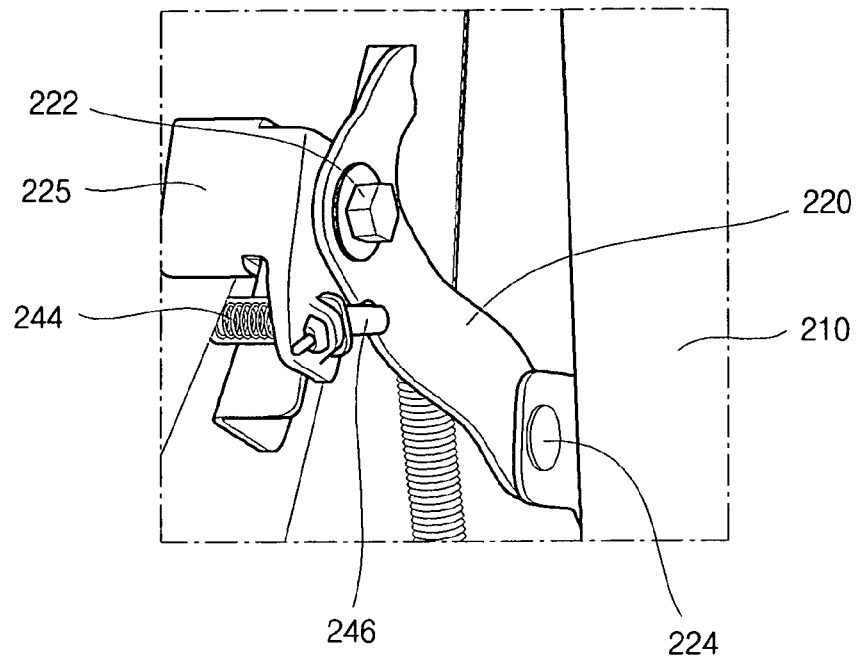
FIG. 3A is a perspective view showing a self locking device of an active headrest after its operation according to an exemplary embodiment of the present invention.
Figure 3B:
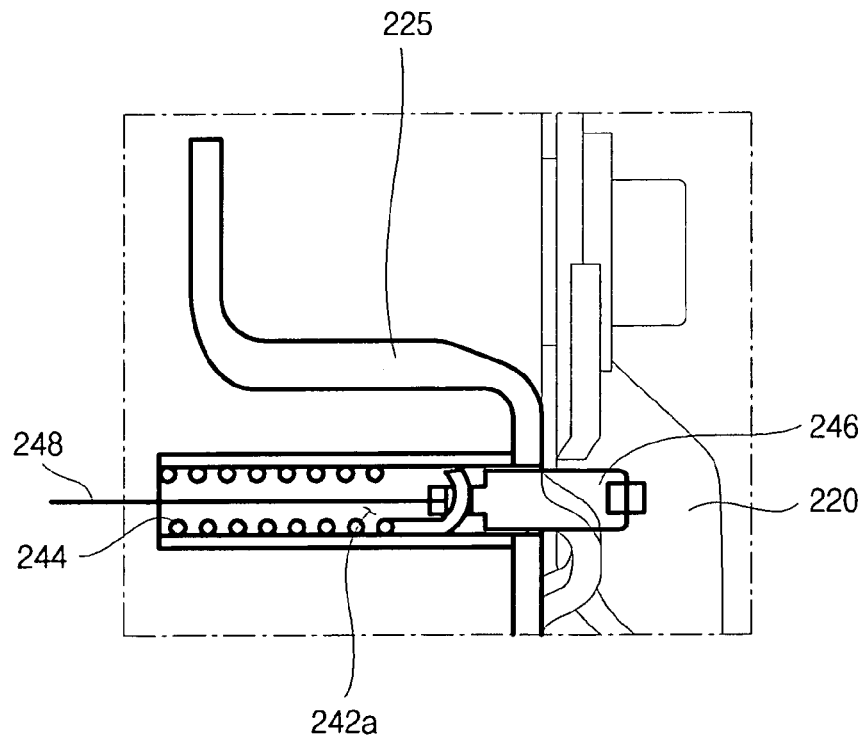
FIG. 3B shows an interior of a self locking device of an active headrest after its operation according to an exemplary embodiment of the present invention.

As shown in FIG. 3A and FIG. 3B, if the receiving indentation 242a is opened by the rotation of the panel link 220 at an operated position of the active headrest 100, the return spring 244 pushes the locking piston 246 out of the receiving indentation 242a.

As shown in FIG. 3A and FIG. 3B, once the locking piston 246 has been pushed out of the receiving indentation 242a, it supports a front side of the panel link 220 such that the panel link 220 cannot rotate toward the front of the seat back frame 200. This is the locking state of the self locking device 240.

Since the panel link 220 cannot rotate to its original position by this, the active frame 230 and the active panel 210 are prevented from being lowered. Accordingly, since the active headrest 100 stays at the operated position, the active headrest 100 can continuously support the head and the neck of an occupant.

As shown in FIG. 2B and FIG. 3B, an end of the strap 248 is fixed to an end of the locking piston 246 where the locking piston 246 and the return spring 244 are coupled to one another, and the other end of the strap 248 extends outside the seat back frame 200.

If the strap 248 is pulled when the self locking device 240 is in its locking state, the locking piston 246 is pulled inside the receiving indentation 242a, compressing the return spring 244. The panel link 220 can then rotate toward the front of the seat back frame 200 by a restoring force of a panel return spring (not shown). The self locking device 240 thus returns to its unlocked state, so that the active panel 210 and the active frame 230 can go down and the active headrest 100 can return to its original position.

An operation of a self locking device of an active headrest according to an exemplary embodiment of the present invention will be briefly explained hereinafter.

As shown in FIG. 2A and FIG. 2B, when impact does not act on a vehicle and the active headrest 100 does not operate, the active panel 210 does not go up, so the panel link 220 does not rotate toward the rear of the seat back frame 200.

Accordingly, since the guide cylinder 242 is concealed by the panel link 220, the locking piston 246 is maintained in a state of being compressed by the panel link 220 and being housed in the receiving indentation 242a. The return spring 244 is also compressed by the locking piston 246. This is the unlocking state of the self locking device 240.

As shown in FIG. 3A and FIG. 3B, if the body of an occupant is forcibly thrust toward the rear of the seat by impact acting on the front or the rear of a vehicle, the active panel 210 goes up by the force delivery apparatus, and the panel link 220 rotates toward the rear of the seat back frame 200 so that an inlet of the guide cylinder 242 is opened, and the locking piston 246 protrudes to the outside of the receiving indentation 242a. This is the locking state of the self locking device 240.

Since the locking piston 246 supports the front of the panel link 220, the panel link 220 does not operate, so that the active panel 210 and the active frame 230 cannot go down. Accordingly, the active headrest 100 can continuously support the head and the neck of an occupant without going down.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A self locking device of an active headrest, the active headrest comprising a panel disposed inside a seat back frame, a panel link coupled to the panel to support the panel and rotate in response to a raising of the panel, and a frame which is raised by the panel, wherein the self locking device comprises:
    a guide cylinder configured to be disposed in the seat back frame such that the guide cylinder is covered by the panel link at a non-operated position of the active headrest and exposed at an operated position of the active headrest, and defining a receiving indentation therein;
    a return spring in the receiving indentation; and
    a locking piston in the receiving indentation, a first end of the locking piston being coupled to the return spring, and a second end of the locking piston being exposed to outside the guide cylinder, wherein the locking piston is kept in the guide cylinder by the panel link at the non-operated position of the active headrest, and pressed outside of the guide cylinder by the return spring to restrain rotation of the panel link at the operated position of the active headrest.

2. The self locking device of claim 1, further comprising a strap coupled to the locking piston for returning the locking piston to inside the guide cylinder.

3. A seat, comprising:
    a seat back frame;
    an active headrest, comprising:
        a panel disposed inside the seat back frame;
        a panel link coupled to the panel to support the panel and rotate in response to a raising of the panel; and
        a frame which is raised by the panel; and
    a self locking device for locking the active headrest, the device comprising:
        a guide cylinder in the seat back frame, covered by the panel link at a non-operated position of the active headrest and exposed at an operated position of the active headrest, and defining a receiving indentation therein;

a return spring in the receiving indentation; and a locking piston in the receiving indentation, a first end of the locking piston being coupled to the return spring, and a second end of the locking piston being exposed to outside the guide cylinder, wherein the locking piston is kept in the guide cylinder by the panel link at the non-operated position of the active headrest, and pressed outside of the guide cylinder by the return spring to restrain rotation of the panel link at the operated position of the active headrest.

4. The seat of claim 3, wherein the device further comprises a strap coupled to the locking piston for returning the locking piston to inside the guide cylinder.

* * * * *